United States Patent [19]  
Calderwood et al.

[11] 3,773,181
[45] Nov. 20, 1973

[54] SEALING MEMBRANES IN A REVERSE OSMOSIS MODULE

[75] Inventors: Andrew S. Calderwood, Monroeville, Pa.; Richard G. Black, Boulder, Colo.

[73] Assignee: Westinghouse Electric Corporation, Pittsburgh, Pa.

[22] Filed: July 8, 1971

[21] Appl. No.: 160,593

[52] U.S. Cl.............. 210/321, 210/433, 210/490, 210/500
[51] Int. Cl............................................. B01d 31/00
[58] Field of Search.................. 210/490, 500, 433, 210/321; 106/196; 260/37 EP

[56] References Cited
UNITED STATES PATENTS

| 3,610,418 | 10/1971 | Calderwood | 210/433 X |
| 3,396,140 | 8/1968 | Weller | 260/37 EP |
| 3,183,198 | 5/1965 | Wagner | 260/37 EP |
| 3,645,938 | 2/1972 | Clarke et al. | 260/17 |
| 3,341,024 | 9/1967 | Lowe et al. | 210/490 |
| 3,265,647 | 8/1966 | Schaeffer, Jr. et al. | 260/37 EP |

Primary Examiner—Frank A. Spear, Jr.
Attorney—F. Shapoe et al.

[57] ABSTRACT

A method of sealing reverse osmosis membranes to a porous support comprises applying a sealant composition, comprising diepoxide resin and amidopolyamine, to the membrane and support in an atmosphere having a relative humidity over 85 percent, said sealant contacting both the membrane and the support.

13 Claims, 2 Drawing Figures

PATENTED NOV 20 1973                                3,773,181

3,773,181

SEALING MEMBRANES IN A REVERSE OSMOSIS MODULE

BACKGROUND OF THE INVENTION

This invention relates to sealing cellulose acetate or other cellulose ester semipermeable membranes into porous support modules made of bonded, resin coated filler particles, in a reverse osmosis apparatus.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis" "pressure osmosis" and "hyper-filtration" are used to describe this process. Reverse osmosis systems have application in many areas such as making potable water from brackish or polluted water and cleaning up waste streams.

Resin bonded sand module supports, such as those disclosed in copending U.S. Ser. No. 754,581, filed on Aug. 22, 1968, were found to be self-supporting and capable of fabrication into rigid modules, with good permeability and a smooth osmotic membrane support surface. Such sand modules, however, tend to leak at the module terminal end face and membrane sealing points.

The membrane sealant is required to set in the presence of water since the membrane after being sealed to its support must be kept wet or it loses its semipermeable properties. This has created problems, since most amine curing agents do not perform well under this condition, resulting in a soft sealant material with little mechanical strength.

The reverse osmosis apparatus disclosed by Calderwood in U.S. Pat. No. 3,610,418 used separate membrane and module sealant compositions, and used peroxide curing agents or dry molecular sieves in epoxy and polysulfide rubber membrane sealant compositions. These membrane sealants tended to occasionally cause the porous module terminal end face to crack due to sealant shrinkage upon cure. There is a need therefore, for improved methods of sealing reverse osmosis membranes to sand supports using a sealant that is compatible with the membrane and support and that can be cured in high humidity to provide a water tight, pressure resistant seal which will not crack the resin bonded support.

SUMMARY OF THE INVENTION

Briefly, the above-mentioned problems are solved by (1) draining water from a porous support module, made of resin bonded filler particles, having flat end faces and at least one bore therethrough containing a leached, modified cellulose acetate semipermeable reverse osmosis membrane therein, in a high humidity atmosphere, (2) priming the membrane ends, in a high humidity atmosphere, with a resin-solvent composition that will partially dissolve the membrane ends allowing the resin to form a rough slightly tacky surface and then (3) applying a combination membrane and module sealant comprising diepoxide resin and amidopolyamine curing agent to the primed membrane ends and module end faces, in a high humidity atmosphere.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
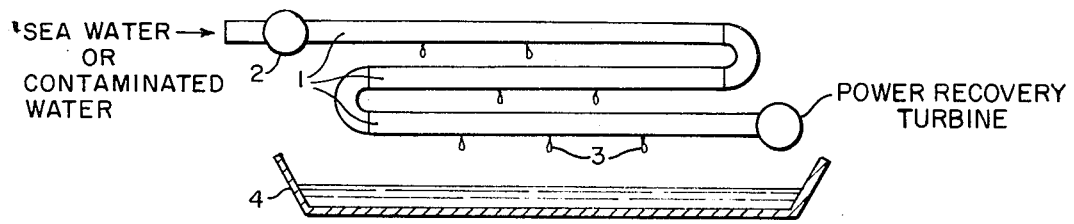
FIG. 1 is a diagram showing the principle for extracting fresh water from sea or contaminated feed water by reverse osmosis.

FIG. 1 illustrates a typical tubular type reverse osmosis system. Sea water or contaminated feed is pumped through a battery of support tubes 1. The pump 2 must exert a pressure greater than the osmotic pressure of the feed and can operate as high as 4,000 psi. The tubes can be mounted in batteries of about 150 each. They serve to support the reverse osmosis membrane contained within the tube wall. The membrane can be made of a cellulose ester, usually modified cellulose acetate compositions by methods well known in the art and described, for example, in U.S. Pat. Nos. 3,310,488, 3,344,214 and 3,133,132.

The tube walls that support the reverse osmosis membranes must be able to withstand the pressure exerted on them by the pump and must be able to allow egress of the pure water effluent 3 into a collecting pan 4. For sea water, several stages of this type may be required before the water is usable.

In the fabrication of the modules used as a support in this invention, a resin, usually in solution, with an added catalyst, is coated onto filler particles in such a way as to leave a thin, dry, uncured film on each filler particle. The resulting particulate composition is free flowing and is cast into a mold of the desired configuration, generally a tubular module having one or more retractable tubes or other means to form the bores in the module. The mold is then heated to cure the resin. The mold is then cooled and the tubes removed. The curing process transforms the filler-resin catalyst composition into a strong rigid open pore tubular support of bonded resin coated filler particles with a thin film of resin bonding each filler particle to the adjacent particles. The tubular support contains voids or pores between the resin coated filler particles allowing egress of the pure water which has passed through the reverse osmosis membrane supported by the inside of the tube bores.

The finely divided filler particles that can be used in the module may be spherical, oval, cubical, or of other irregular configuration. Some examples of suitable filler particles are foundry sand, silica, silicon carbide, zircon, quartz, alumina, beryl, glass, limestone, magnesium aluminum silicate, calcium silicate, sillimanite ($Al_2O_3SiO_2$) or any other rigid filler with a granular structure that is compatible with the resin system it is used with.

The preferred average particle size range of fillers for use in the module construction is between about 50 and 250 microns, although the outer limits are between 40 and 500 microns. Below 40 microns, the resin-filler support tube lacks the desired porosity for low resistance to water flow and about 500 microns the tube does not properly support the osmotic membrane.

A variety of resins can be used to coat the filler particles in the module, but phenolic resins are preferred because they can be bought cheaply and in readily usable form. Phenolic resins are well known in the art and are thoroughly discussed in Megson, *Phenolic Resin Chemistry*, Academic Press, 1958, particularly Chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfural.

Other resins well known in the art which may be used as the coating and bonding agent in the resin bonded filler module of this invention include: polyglycidyl ethers (see Lee and Nevill, *Handbook of Epoxy Resins*, McGraw Hill, 1966, particularly Chapter 2), polyesters and allyl resins (see Bjorksten, *Polyesters and Their Applications*, Reinhold Publishing Corporation, 1956, pages 1–34), silicones and furane resins (see Brydson, *Plastic Materials*, D. Van Nostrand Co. 1966, Chapters 24 and 25), polyimide and polyamide-imide resins (see Frost and Bower, *Aromatic Polyimides*, J. Polymer Science, Part A, Volume 1, 1963, 3135–3150 and U.S. Pat. Nos. 3,179,631; 3,179,632; 3,179,633 and 3,179,634 on polyimides and U.S. Pat. No. 3,179,635 on polyamide-imides).

The weight percent resin that can be used to coat the filler particles used to make the modules of this invention will range from about 1 to 18 percent of the coated filler particle weight. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

Figure 2:
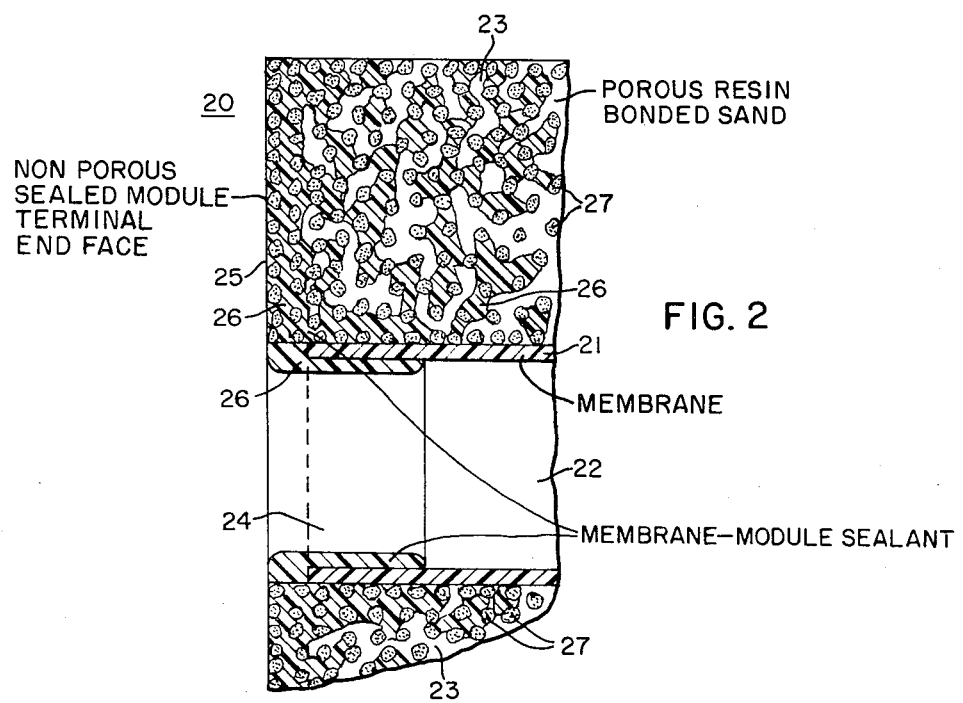
FIG. 2 is a cross sectional view of the end of one type of a membrane support made of resin bonded filler particles showing the sealant contacting both the membrane and the support.

Referring now to FIG. 2 of the drawings, a side elevational view of the resin bonded module 20 is shown, with a modified cellulose acetate reverse osmosis membrane 21 lining one of the module feed water bores 22 to within about one-fourth inch of the module end face 25.

Since it is essential that the purified effluent product water is kept separate from the feed liquid, the membranes must be properly sealed into the module feed water bores. As the porous resin coated filler particle matrix 23 contains the product water, the problem occurs at two places. The membranes inserted or cast into the support module must be sealed at the terminal end of the feed water bores 24 and also the porous terminal ends of the module 25 must be sealed where the metal or plastic end plates and bore connecting means are to be attached.

The main problem has been sealing the ends of the membranes, lining the feed water bores, against the terminal bore ends. The cellulose acetate membranes must be kept wet, as they lose their rejection properties after drying for about 20 minutes and shrink by as much as 40 percent of their original diameter if allowed to dry in air. Conventional adhesives either contain solvents which completely destroy the membrane, or the water prevents adhesion and complete curing of the sealant.

It has been found that the porous filler particle matrix of the module as well as the membrane can be sealed with a liquid-impermeable diepoxide sealant 26. Such sealant should have a low viscosity in order to penetrate the pores 23 between the sand granules 27 to form a liquid impermeable seal. The sealant must be strong and flexible and cure with minimal shrinkage, otherwise the sand support can crack, especially if it is a tubular module containing a large number of bores. The shrinkage can only be up to about 4 percent post gellation shrinkage, i.e., percent change in volume of the sealant composition after the liquid stage has been passed and the gellation or thermoplastic stage has been reached, including thermal shrinkage brought about by cooling of the solid sealant to room temperature. The sealant must also cure in the presence of water and not harm the cellulose acetate membrane or the resin bonding the sand together. It must be adherable to the membrane alone or with the use of a primer which can be used to make the membrane tacky. It must also seal the joint between the porous support and the metal shell of those modules having an external metal shell, to provide additional support at high pressures. The sealant must have good adhesion to the metal and have sufficient flexibility to withstand cracking during subsequent temperature and pressure cycling.

We found that a liquid diepoxide resin composition of, for example, a liquid diglycidyl either of bisphenol "A" having a viscosity between about 7,000 to 15,000 cp at 25°C and an epoxy equivalent weight between about 170–250 and a liquid diglycidyl ether of an aliphatic polyglycol having a viscosity between about 30 to 500 cp at 25°C and an epoxy equivalent weight between about 250–400 could be made into an excellent module and membrane sealant. When used with an amido-amine type curing agent, the composition is strong and flexible and has a low viscosity, a rapid cure cycle with little shrinkage (about 2.0 percent post gellation shrinkage), will cure in a water saturated atmosphere and will not harm the cellulose ester membrane or resinous sand binders. The sealant may also incorporate fine filler particles to help reduce thermal shrinkage in the module, and prevent flow on vertical surfaces so that penetration into the module ends can be easily controlled. The diepoxide resin composition comprises a combination of epoxy resins one of which provides strength and the other of which provides flexibility to the cured composition.

Especially suitable fillers which impart thixotropic and flatting properties to the sealant for use in sealing the module end face are colloidal silica, colloidal alumina, aluminum silicate, calcium silicate and magnesium silicate. The upper limit of average particle sizes that can be used in the sealant is about 150 microns. The preferred average particle size range of fillers which is useful to impart thixotropic properties to the sealant composition is between about 0.001 and 20 microns. This type filler gives the composition thixotropic properties when used at concentrations of about ½ to 10 percent of the sealant weight and allows smooth, flat terminal end faces and terminal end bore surfaces, after a single application. The addition of filler up to about 20 percent of the sealant composition weight is especially useful to reduce post gellation shrinkage. The filler we found particularly advantageous was pyrogenic silica ($SiO_2$).

The diglycidyl ether of bisphenol "A" resin:

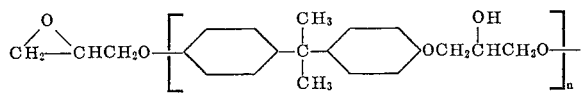

where $n = 0$ to 2.

provides adhesion and strength while the polyetherglycol type such as, for example, a diglycidyl ether of polypropylene glycol:

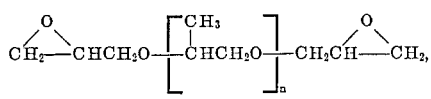

where $n = 2$ to 12 imparts flexibility to the cured composition. The proportion of each resin must be adjusted to give the diepoxide composition the required combination of flexibility and strength.

We found, for modules made of resin bonded filler particles, the required amount of the polyglycol-type resin, to impart the required flexibility to the cured diepoxide sealant, ranged from about 8–42 weight percent of the diepoxide resin-curing agent composition, the required amount of the bisphenol "A" type resin, to impart strength, ranged from about 22–67 weight percent of the diepoxide resin-curing agent composition, and the required amount of the amidopolyamine type curing agent ranged from about 22–57 weight percent of the diepoxide resin-curing agent composition.

The amidopolyamine curing agent is used in rather large quantities and is not affected in its ability to convert the diepoxide to the cured state by contact with damp or wet surfaces. Amidopolyamines are derived from a monobasic carboxylic acid and an aliphatic polyamine. The acids employed in such synthesis are usually of the $C_{16}$, $C_{18}$ and $C_{19}$ types and the polyamines used range from diethylenetriamine, triethylenetetramine, and tetraethylene-pentamine to piperazine. The amidopolyamine structure is of the general form:

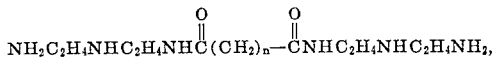

where $n = 2$ to 8, and

where $n = 1$ to 18. They have found use in tile setting adhesives which cure in the presence of water and their general properties can be found in Lee and Neville, *Handbook of Epoxy Resins*, 1967, at Chapter 10–3.

The adhesion of the sealant to the wet cellulose acetate membranes used in the reverse osmosis modules, has been found to be enhanced by the use of a primer based on polyurethane, furane or vinyl acetate resin. The primer generally consists of the resin in combination with a solvent. The primer is spread thinly on the membrane. The solvent chemically attacks the smooth membrane surface slightly before evporating, allowing the resin to form a rough slightly tacky surface which gives a better adhesion with the diepoxy adhesive system.

Before applying the sealant it is important to remove any free water from the porous support in order to allow the sealant to penetrate. The successful application of the resin sealant composition system to the sealing of reverse osmosis membranes is dependent on the correct application and curing technique. The composition contacts and seals two joints, first between the membrane and the porous support of resin-bonded sand and secondly between the porous support and the outer metal flange. Between these joints the exposed end face of porous sand must also be sealed. The preferred method of applying the sealant is by a two coat system applied to the horizontal end face. The first coat is of low viscosity which penetrates to as much as ½ inch depth into the porous sand. The second coat has a higher viscosity and is thixotropic due to added filler and this seals the two joints externally and provides a smooth resin end face for gasket or O ring sealing. The sealant can also be applied by dipping the module ends in sealant or by a pouring operation using plugs in the module bores which would prevent sealant running down the length of the bores while still allowing sealant membrane contact.

The curing procedure requires that the membranes must remain wet, but due to the porous nature of the support, immersing the module underwater results in air bubbles and water penetrating the sealant before it cures. It was found that this problem was eliminated by allowing the module to cure in a closed chamber in which the atmosphere was saturated by water vapor. Under these conditions our particular resin sealant cured well and the membranes did not dry out. The atmosphere must have above about 85 percent relative humidity. Since the diepoxide-amidopolyamine sealant may take as long as 24 hours to completely cure, it is essential that the humidity in the chamber be maintained over about 85 percent or the membranes will slowly dry out, especially at the ends near the terminal face of the module.

The nature of the tubular porous support module allows the reverse osmosis membranes to be cast and leached in place inside the module feed bores. The leaching step to form the osmotic skin of the membrane after the membrane film is cast will usually involve immersion of the module, containing the cast membrane, in cold water. The initial step of our method allows drainage of this water or other leaching liquid such as alcohol from the module pores for more than about ½ hour in the humidity chamber prior to the sealing operation, to allow ease of sealant penetration and more effective curing.

Needless to say, the module sealant composition of this invention can be used in a variety of other reverse osmosis apparatus configurations, for example, it can be used to bond flat cellulose ester reverse osmosis membranes to flat supports which may be made of resin bonded filler particles.

EXAMPLE I

A reverse osmosis apparatus was made, containing 18 parallel ½ diameter membrane containing axial bores in a porous support and a stainless steel perforated outer shell, having means to supply feed, exhaust feed and collect the purified water. The support was made from foundry sand, having an average particle size of about 180 microns, and the resinous reaction product of a phenol and an aldehyde, in solution, having a viscosity at 25°C of 400 cp and a solids content at 135°C of 67 percent (sold commercially by Hooker Chemical Corporation under the trade name Durez Phenolic Resin 18115). The resin was mixed with sand and hexamethylenetetramine catalyst to uniformly coat it. The mixture was then poured into the shell, which acted as a mold and contained removable rods, and cured at about 175°C in a Norman kiln oven. The resulting module contained resin in the range of about 4 weight percent of the coated filler particle weight. The module was 4 feet long and 3 ½ inches in diameter. Osmotic membranes were cast in place, within the axial bores through the module, from a casting solution containing about 25 weight percent cellulose acetate, 45 weight percent acetone and 30 weight percent formamide (methanamide). The membranes were leached in place by immersing the module containing them in cold water, to form an osmotic skin.

The porous support module, having the semipermeable reverse osmosis membrane therein, was placed in a humidity chamber. This was a plastic box 14 inches square and 5 ½ feet high. Air was circulated in a closed loop by a fan through the box and over a packing of flexirings in a column 5 feet high and 4 inches in diameter. The packing was kept wet by a spray of water at room temperature and evaporation of the water maintained the relative humidity at more than 95 percent. The sand module end face was cut and filed flush with the outer shell. The ends of the bores were chamfered at an angle of 45° to the end face to a 1/16 inch depth. The module was then allowed to stand vertically in the closed humidity chamber for one hour to allow most of the water used in leaching the membrane to drain from the module pores.

The humidity chamber top was opened and the ends of the bores dried with cotton swabs. The end of the membranes, i.e., the inner sides near the module terminal end face were thinly coated to a depth of one-half inch down the bore with a polyurethane-solvent primer (sold commercially by Thiokol Chemical Corp. under the trade name TPR–421 primer). The chamber was then closed and the primer allowed to set for five minutes in the 95 percent humidity atmosphere.

The diepoxide resin membrane-module sealant composition was mixed, containing: 10 grams of a liquid diglycidyl ether of bisphenol "A" resin, having a viscosity of between 7,000–10,000 cp at 25°C and an epoxy equivalent weight of between 182–189 (sold commercially by Ciba Products Co. under the trade name Araldite 6005 Epoxy Resin); 1.5 grams of a liquid diglycidyl ether of propylene glycol ($n = 9$), having a viscosity between 55–100 cp at 25°C and an epoxy equivalent weight of between 305–335 (sold commercially by Dow Chemical Co. under the trade name DER 732 Epoxy Resin) and 4.3 grams of an amidopolyamine curing agent, of the type $NH_2C_2H_4NHC_2H_4NHCO(CH_2)_nOCNHC_2H_4-NHC_2H_4NH_2$ where $n$ was between 2 and 8 (sold commercially by Celanese Corp. under the trade name Epicure 870). This gave a composition having 63 weight percent bisphenol "A" type resin, 9 weight percent epoxy-glycol-type resin, 28 weight percent curing agent, and a post gellation shrinkage of about 2 percent.

This resin was heated under a heat lamp for a few minutes at a 6 inch distance until all the bubbles were dispensed and the resin sealant had a watery consistency. The top of the humidity chamber was opened and the resin sealant brushed liberally over the sand end face. The end face was then recoated with the warm sealant which penetrated about one-eighth inch into the module end. A thin coat of room temperature resin sealant was then applied with a narrow brush in a thin coat on the membrane ends to a depth of about one-half inch from the end face and chamfered ends of each bore so that the sealant contacted both the membrane and the support and glued them together.

A membrane-module sealant composition containing filler particles was then applied about one thirty-second inch thick with a spatula to the end face. This second coat had a higher viscosity and was thixotropic due to the filler. It contained, for each five grams of the diepoxide-curing agent composition described above, 0.3 grams (5.6 weight percent) fumed (pyrogenic) silicon dioxide having an average particle size of 0.007 microns (sold by Godfrey L. Cabot, Inc. under the trade name Cab-O-Sil EH-5). The use of the filled sealant was optional and may be substituted with another coat of the unfilled room temperature sealant. The humidity chamber, at 95 percent relative humidity, was then closed and the sealant allowed to cure for 18 hours.

The chamber was then opened, the module inverted, allowed to drain for one-half hour and the same procedure followed as above to seal the other end of the module.

Finally the epoxy and faces were smoothed off with light filing, end flanges bolted on and the module tested. The seals successfully withstood pressures of 450 psi and operated at 350 psi for 700 hours continuously with no leakage or failure.

We claim:

1. A method for sealing reverse osmosis membranes to a porous support, made of resin bonded filler particles, comprising the steps of:
   A. in an atmosphere having a relative humidity of over 85 percent:
      1. applying a water curable sealant composition comprising about 22 to 67 percent of a diglycidyl ether of bisphenol "A" about 8 to 42 weight percent of a diglycidyl ether of an aliphatic polyglycol and about 22 to 55 weight percent of an amidopolyamine to the reverse osmosis membrane and the porous support made of resin bonded filler particles, said sealant composition having a post gellation shrinkage of up to about 4 percent, and contacting both the membrane and the support.

2. The method of claim 1 wherein the porous support is a module having a flat end face and at least one bore therethrough containing therein a tubular semipermeable cellulose ester membrane.

3. The method of claim 2 wherein the membrane is cast in place within the module bores and leached in water to form an osmotic skin, wherein as a first step the water is drained from the porous module, and wherein the sealant contacts the module bore ends and the membrane ends to seal the membrane and support together.

4. The method of claim 2, wherein the diglycidyl ether of bisphenol "A" is a liquid, has a viscosity between about 7,000 and 15,000 cp at 25°C and an epoxy equivalent weight between about 170 and 250, the diglycidyl ether of an aliphatic polyglycol is a liquid, has a viscosity between about 30 and 500 cp at 25°C and an epoxy equivalent weight between about 250 and 400.

5. The method of claim 2 wherein the sealant composition applied to the module end faces also contains about 1/2 to 20 weight percent filler having an average particle size between about 0.001 and 150 microns.

6. The method of claim 2 wherein the filler particles making up the module have an average particle size between about 40 and 500 microns and the resin bonding said particles together comprises from about 1 to 18 percent of the coated filler particle weight, said resin being selected from the group consisting of phenolics, polyglycidylethers, polyesters, silicones, polystyrenes, polyimides, polyamide-imides, allyl resins and furane resins.

7. The method of claim 2 wherein the filler is sand, the resin coating the filler is a phenolic resin, the membrane is a modified cellulose acetate membrane, the diglycidyl ether of an aliphatic polyglycol is a diglycidyl ether of a polypropylene glycol and the amidopolyamine is seleceted from the group consisting of amidopolyamines having the structural formula:

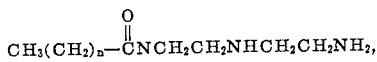

where $n = 1 - 18$ and

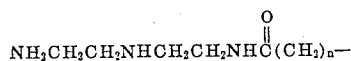

where $n = 2 - 8$.

8. The method of claim 2 wherein, before step 1, the membrane ends are primed with a resin-solvent composition that will partially dissolve the membrane ends to form a rough slightly tacky surface on the membrane ends.

9. A cellulose acetate reverse osmosis membrane sealant composition comprising:
1. about 22 to 67 weight percent of a liquid diglycidyl ether of bisphenol "A" having a viscosity between about 7,000 and 15,000 cp at 25°C and an epoxy equivalent weight between about 170 and 250,
2. about 8 to 42 weight percent of a liquid diglycidyl ether of an aliphatic polyglycol having a viscosity between about 30 and 500 cp at 25°C and an epoxy equivalent weight between about 250 and 400 and
3. about 22 to 55 weight percent of an amidopolyamine selected from the group consisting of amidopolyamines having the structural formula:

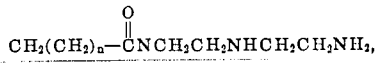

where $n = 1 - 18$, and

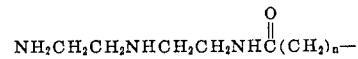

where $n = 2 - 8$, said composition being water curable and having a post gellation shrinkage up to about 4 percent.

10. The sealant composition of claim 9 also containing filler particles having an average particle size range from about 0.001 to 150 microns.

11. A reverse osmosis apparatus to provide purified water from a feed liquid comprising:
a. a porous reverse osmosis membrane support made of bonded resin coated filler particles,
b. a cellulose ester semipermeable reverse osmosis membrane in contact with the support,
c. a sealant composition contacting the membrane and support and sealing them together, said sealant having the composition of claim 9,
d. means to supply feed liquid to the apparatus,
e. means to exhaust feed liquid from the apparatus, and
f. means to collect purified water.

12. The reverse osmosis apparatus of claim 11 wherein the porous support is a module made of resin bonded filler particles, having a flat end face and at least one bore therethrough containing therein a semipermeable cellulose ester membrane.

13. The reverse osmosis apparatus of claim 12 wherein the filler making up the module is sand having an average particle size between about 40 and 500 microns, the resin bonding said particles together comprises from about 1 to 18 percent of the coated filler particle weight, the resin being selected from the group consisting of phenolics, polyglycidylethers, polyesters, silicones, polystyrenes, polyimides, polyamide-imides, allyl resins and furane resins and the membrane is a modified cellulose acetate membrane.

* * * * *